(12) United States Patent
Yates et al.

(10) Patent No.: US 12,130,662 B2
(45) Date of Patent: Oct. 29, 2024

(54) SINGLE SURFACE TOP COVERS FOR INFORMATION HANDLING SYSTEMS

(71) Applicant: DELL PRODUCTS L.P., Round Rock, TX (US)

(72) Inventors: Brian J. Yates, Cedar Park, TX (US); Nicholas D. Abbatiello, Round Rock, TX (US); Priyank J. Gajiwala, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 291 days.

(21) Appl. No.: 17/356,222

(22) Filed: Jun. 23, 2021

(65) Prior Publication Data
US 2022/0413549 A1    Dec. 29, 2022

(51) Int. Cl.
*G06F 1/16*    (2006.01)

(52) U.S. Cl.
CPC .......... *G06F 1/1616* (2013.01); *G06F 1/1656* (2013.01)

(58) Field of Classification Search
CPC ..... G06F 1/1616; G06F 1/1656; G06F 1/1662
See application file for complete search history.

(56) References Cited

U.S. PATENT DOCUMENTS

| | | | |
|---|---|---|---|
| 9,318,791 B2 | 4/2016 | Leonard et al. | |
| 9,496,932 B1 | 11/2016 | Prendergast et al. | |
| 9,766,707 B2 | 9/2017 | Schuckle et al. | |
| 2007/0001923 A1* | 1/2007 | Slattman | H01Q 1/246 343/872 |
| 2009/0040790 A1* | 2/2009 | Payne | G06F 1/1616 362/632 |
| 2014/0254078 A1* | 9/2014 | Matsuoka | G06F 1/1679 361/679.55 |
| 2015/0370339 A1* | 12/2015 | Ligtenberg | G06F 3/0412 345/168 |
| 2018/0218859 A1* | 8/2018 | Ligtenberg | G06F 3/0488 |
| 2021/0096655 A1* | 4/2021 | Ishihara | B32B 27/32 |
| 2021/0181803 A1* | 6/2021 | Gupta | G06F 1/1616 |
| 2021/0405705 A1* | 12/2021 | Rose | G06F 1/1647 |
| 2022/0308623 A1* | 9/2022 | Yu | A61L 2/10 |
| 2022/0411602 A1* | 12/2022 | Bajaj | C08K 3/36 |
| 2023/0008336 A1* | 1/2023 | Schwager | G02F 1/1339 |

(Continued)

OTHER PUBLICATIONS

Ho et al., "Systems And Methods For Detecting Battery System Swelling In Information Handling Systems", Dell:281, U.S. Appl. No. 16/859,015, filed Apr. 27, 2020, 35 pgs.

(Continued)

*Primary Examiner* — Anthony Q Edwards
(74) *Attorney, Agent, or Firm* — Egan, Enders & Huston LLP

(57) ABSTRACT

Disclosed herein are single surface top covers for portable information handling systems, and that employ a substrate of thermoplastic fiberglass composite which is impregnated with polycarbonate material. The thermoplastic fiberglass composite material may be recyclable, and the thermoplastic fiberglass composite material may be impregnated with recycled polycarbonate material. A selective UV molding process may be employed to create multiple different finishes on the same upper surface of a single surface top cover by applying a nano coat of a textured UV light curable resin on at least a portion of the upper surface of a single surface top cover.

23 Claims, 12 Drawing Sheets

(56) References Cited

U.S. PATENT DOCUMENTS

| | | | |
|---|---|---|---|
| 2023/0010653 A1* | 1/2023 | Schwager | G02F 1/13452 |
| 2023/0034118 A1* | 2/2023 | Wolff | G06F 1/1662 |
| 2023/0108323 A1* | 4/2023 | Yu | G06F 1/1616 |
| | | | 361/679.27 |
| 2023/0126612 A1* | 4/2023 | Gajiwala | G06F 3/0202 |
| | | | 340/407.2 |
| 2023/0134745 A1* | 5/2023 | Moon | G06F 1/1681 |
| | | | 361/679.27 |
| 2023/0294370 A1* | 9/2023 | Tsuda | B29C 70/545 |
| | | | 428/156 |

OTHER PUBLICATIONS

Pelissier et al., "Systems And Methods For Resolving Touch And Pen Conflicts Between Multiple Touch Controllers Coupled To A Common Touchscreen Display", Dell:305, U.S. Appl. No. 17/150,423, filed Jan. 15, 2021, 48 pgs.
Wikipedia, "FR-4", Printed From Internet Jun. 3, 2021, 6 pgs.
CCL, "Technical Data Sheet", GF9xIP, Mar. 2021, 2 pgs.
Synaptics, "ClickPad" Product Brief, 2016, 1 pg.
Synaptics, "TouchPad", Product Brief, 2016, 1 pg.

\* cited by examiner

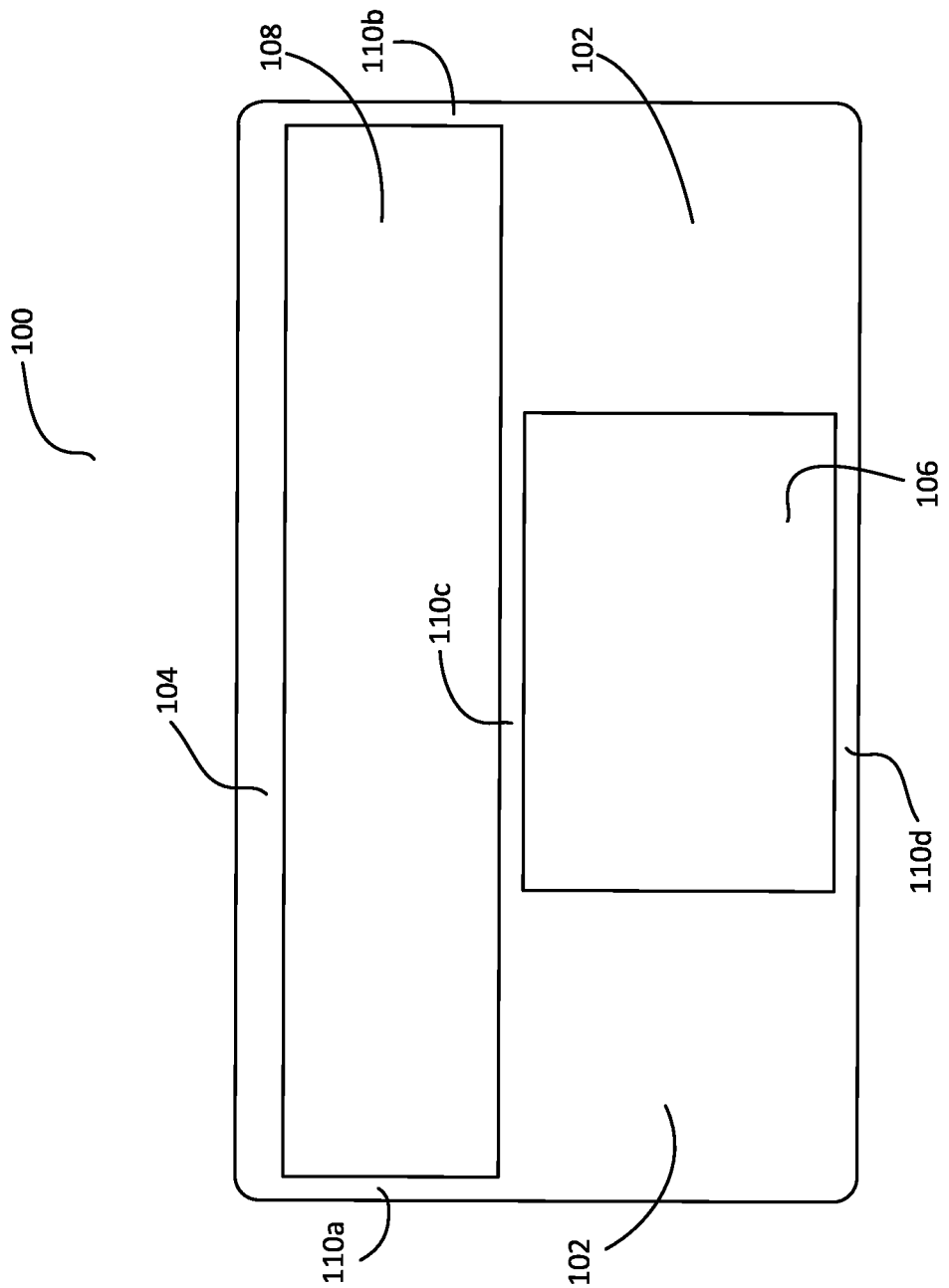

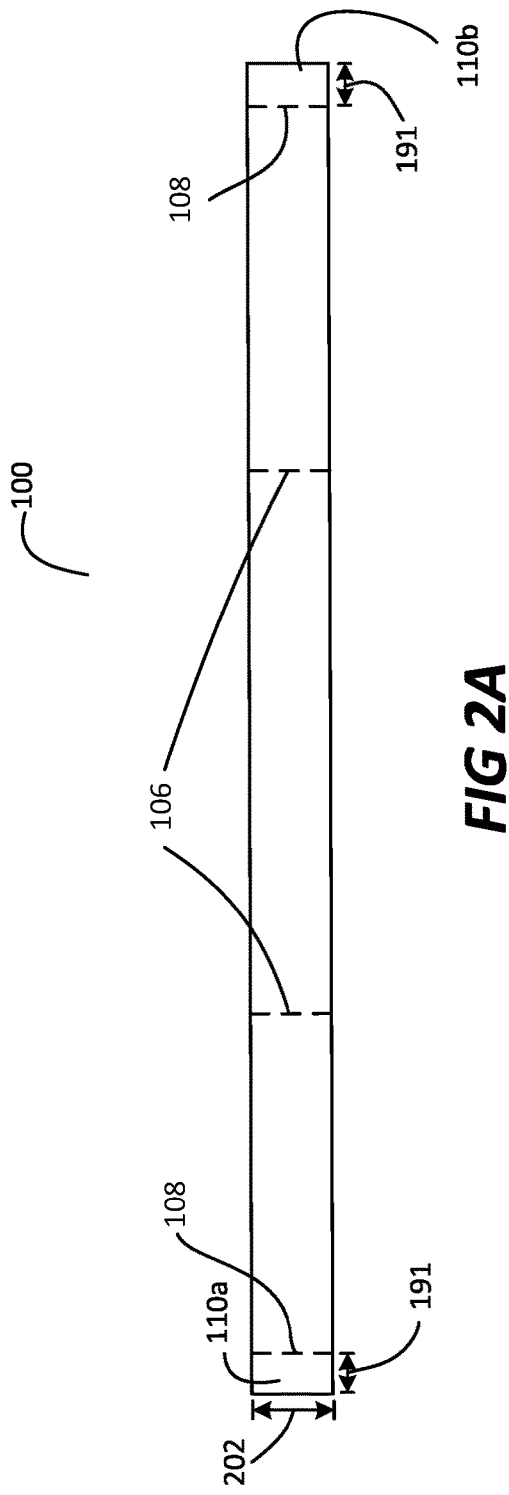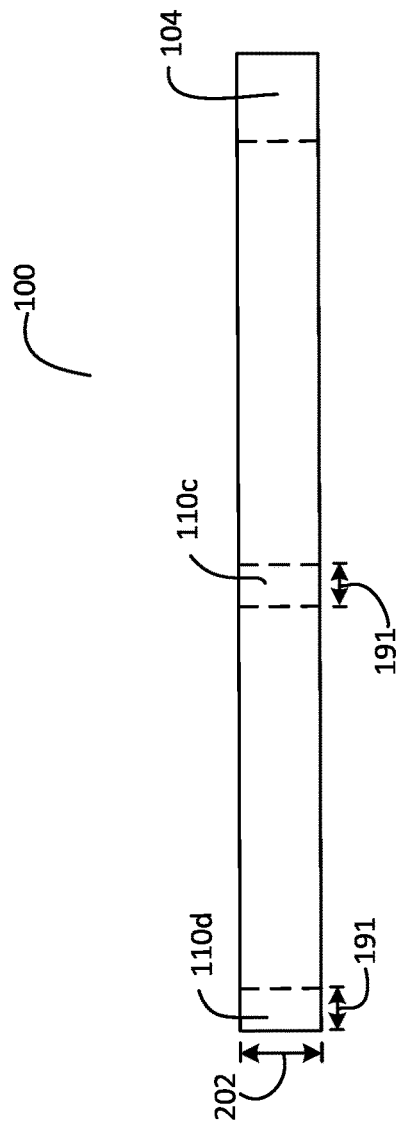

SINGLE SURFACE TOP COVERS FOR INFORMATION HANDLING SYSTEMS

FIELD

This invention relates generally to information handling systems and, more particularly, to top covers for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include notebook computers. A conventional top cover for a notebook computer lies on the upper surface of the notebook computer base surrounding the keyboard area, and includes a palmrest area and a touchpad area. A top cover is sometimes formed as a single unitary piece of glass that has a seamless surface and includes a haptics-enabled touchpad that requires a minimum level of stiffness to support proper operation of the haptics effects. Although the single glass top cover surface provides the required stiffness for supporting operation of a haptics-enabled touchpad, the glass material of the touchpad has limited durability and is prone to damage such as chipping, cracking and scratching.

Conventional polycarbonate-based top covers are sometimes formed by an injection molding process to be a single unitary piece of polycarbonate resin with 10% to 50% chopped glass fiber by weight, but must have a minimum top cover width that is greater than 1 millimeter present as side walls at the left and right edges of the keyboard. Moreover, such conventional polycarbonate-based top cover materials do not provide light transmission and sufficient stiffness that is typically desired in the touchpad area. For conventional top covers, only the touchpad area itself has been formed using coating of cured UV resin to provide a glass-like feel to a touchpad user. Thus, conventional notebook computers having cover widths of 1 millimeters or less at the left and right edges of the keyboard must be provided with a touchpad area component that is a separate component from the palmrest component. This is because such conventional top covers require a separate touchpad component in combination with separate polycarbonate top cover components (i.e., that are separate components from the palmrest component) at the left and right keyboard edges in order to provide acceptable notebook computer rigidity and mechanical operation.

SUMMARY

Disclosed herein are single surface top covers for portable information handling systems that employ a substrate of thermoplastic fiberglass composite which is impregnated with polycarbonate material. Examples of such portable information handling systems include, but are not limited to, battery-powered systems such as notebook computers, tablet computers, convertible computers, smart phones, etc. In one embodiment, the thermoplastic fiberglass composite material may be recyclable, and in a further embodiment the thermoplastic fiberglass composite material may be impregnated with recycled polycarbonate material. In one embodiment, the fiberglass of the disclosed top covers may be employed to provide top cover stiffness and a Underwriters Laboratory (UL) 94V-0 flammability rating.

In one embodiment, a single unitary piece of thermoplastic fiberglass composite which is impregnated with polycarbonate material may be utilized to form a non-glass single surface top cover that has a seamless upper surface (i.e., an upper surface with no gaps or seams formed or otherwise defined in the seamless upper surface) for a portable information handling system, such as a notebook computer. In a further embodiment, such a single surface top cover may include a haptics-enabled touchpad, with the impregnated thermoplastic fiberglass composite providing a sufficient stiffness to support proper operation of haptics effects (e.g., touchpad vibration). Advantageously, the single surface impregnated thermoplastic fiberglass composite top cover surface of the disclosed embodiments provides the required stiffness for supporting operation of a haptics-enabled touchpad, and also exhibits good durability and resistance to damage such as chipping, cracking and scratching (whether or not a haptics-enable touchpad is present). Moreover, the seamless nature of the disclosed single surface impregnated thermoplastic fiberglass composite top cover prevents liquid damage to underlying electronics since no gaps are present around the touchpad area and/or integrated keyboard area (i.e., in an exemplary embodiment that employs a single c-cover with multi-texture keyboard keys).

In another embodiment, a single unitary piece of thermoplastic fiberglass composite which is impregnated with polycarbonate material may be utilized to form a single surface top cover (e.g., including the palmrest and touchpad areas) for a portable information handling system that has a top cover width at side walls of less than 5 millimeters (e.g., from 1 to 5 millimeters, alternatively from 2 to 5 millimeters, and alternatively of 1 millimeter) present at one or more edges of a keyboard of the system. In such an embodiment, the single surface impregnated thermoplastic fiberglass composite top cover surface provides sufficient cover stiffness for acceptable notebook computer rigidity and mechanical operation, e.g., without requiring extra top cover thickness compared to conventional top cover thicknesses, and without bending or deformation occurring at the keyboard edges.

In another embodiment, impregnated thermoplastic fiberglass composite material of a single surface portable information handling system top cover may be light transmissive in one or more areas, e.g., so as to transmit light from below the top cover and through the body of the top cover so that the transmitted light is visible on the upper surface of the top cover to a user of the portable information handling system.

In another embodiment, a selective UV molding process may be employed to create multiple different finishes on the same upper surface of a single surface top cover of a portable information handling system, e.g., to provide a gloss (e.g., high gloss) finish on one or more areas of the upper surface and to provide a matte finish on one or more other areas of the upper surface of the same single surface top cover). For example, a second and different finish (e.g., gloss finish) may be so provided by applying a nano coat of textured UV resin on a portion of the upper surface of a single surface top cover that is different from a first finish (e.g., matte finish) that is provided on a different portion of the same top cover, e.g., in order to highlight a functional area (e.g., such as a touchpad active area) of the top cover to a user of a portable information handling system. Alternatively or additionally, a physical step down area (e.g., of 0.05 millimeter) from a palmrest area may be provided on the upper surface of the top cover to provide a tactile feeling for the active area or region of a touchpad, e.g., to provide the look (or illusion) of two separate top cover pieces without the presence of any gaps in the single unitary component single surface top cover (that includes both palmrest and touchpad areas), and optionally in combination with a gloss finish that provides a glass-like feel to the touchpad area.

In other embodiments, other features may be implemented alone or in combination for a single surface top cover of a portable information handling system such as a notebook computer. Examples of such other features include, but are not limited to, optical printing for backlighting purposes, custom backlight inking for lighted keys (e.g., such as an adaptive row), ultraviolet (UV) light molding to form a glass-like texture/hardcoat, formation of micro holes through the top cover substrate for speaker custom speaker location/s (e.g., such as micro holes having a diameter that are smaller than the minimum diameter of holes that may be successfully formed through a glass substrate), and/or an anti-smudge coating provided on the upper surface of the top cover.

In one respect, disclosed herein is an apparatus, including a single surface top cover dimensioned to mate with a base component of a portable information handling system, the single surface top cover including a single unitary substrate of thermoplastic fiberglass composite that is impregnated with polycarbonate material.

In another respect, disclosed herein is a method, including forming a single surface top cover dimensioned to mate with a base component of a portable information handling system, the single surface top cover including a substrate of thermoplastic fiberglass composite that is impregnated with polycarbonate material.

BRIEF DESCRIPTION OF THE DRAWINGS

FIG. 1 illustrates an overhead view of a single surface top cover according to one exemplary embodiment of the disclosed apparatus and methods.

FIG. 2A illustrates a frontal edge view of the single surface top cover of FIG. 1.

FIG. 2B illustrates a right side edge view of the single surface top cover of FIG. 1.

DESCRIPTION OF ILLUSTRATIVE EMBODIMENTS

Figure 3:
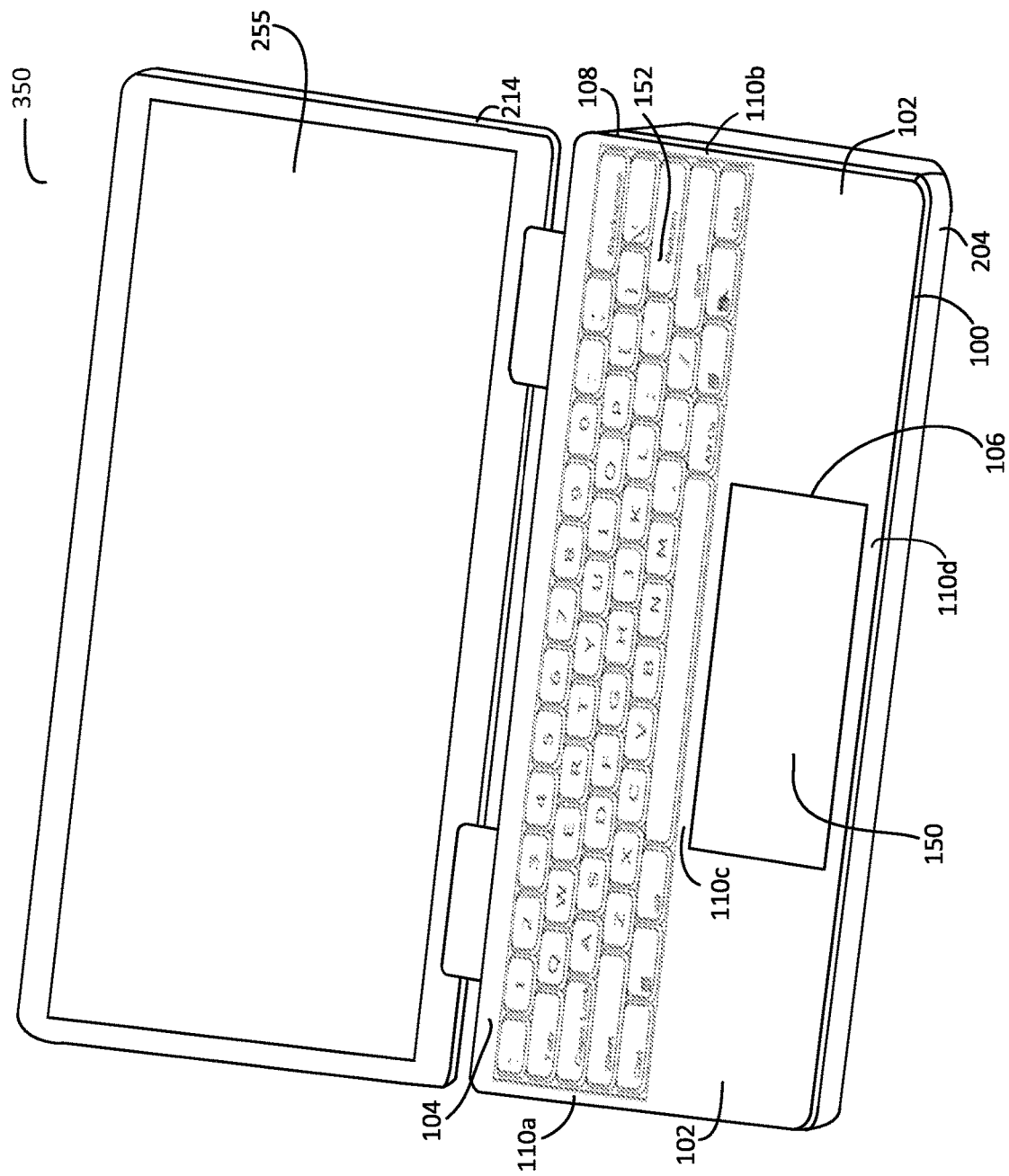
FIG. 3 illustrates a frontal overhead perspective view of a portable information handling system according to one exemplary embodiment of the disclosed apparatus and methods.

FIG. 1 illustrates an overhead view of one exemplary embodiment of a single surface top cover 100 for a notebook computer in the form of a single unitary sheet of thermoplastic fiberglass composite which is impregnated with polycarbonate material. Although a notebook computer embodiment is illustrated in FIG. 1, it will be understood that in other embodiments a single surface top cover may be provided for other types of battery-powered or otherwise portable information handling systems, e.g., such as tablet computers, convertible computers, smart phones, etc. Components and configurations of portable information handling systems is found, for example, in U.S. Pat. Nos. 9,318,791 and 9,496,932, which are each incorporated herein by reference in their entirety for all purposes.

As shown in FIG. 1, single surface top cover 100 includes an outer peripheral edge 101 that surrounds a touchpad opening 106 defined in a palmrest area 102 of the single surface top cover and a keyboard opening 108 that is defined between the palmrest area 102 and a header area 104 of the top cover 100. Each of touchpad opening 106 and keyboard opening 108 are defined to extend through the entire thickness of the body of single surface top cover 100. FIG. 2A illustrates a frontal edge view of single surface top cover 100, showing the keyboard opening 108 and touchpad opening 106 delineated by hidden lines. FIG. 2B illustrates a right side edge view of single surface top cover 100, showing the keyboard opening 108 and touchpad opening 106 delineated by hidden lines. In one embodiment, a thickness 202 of single surface top cover 100 of FIGS. 2A and 2B may be greater than 0.3 millimeter, alternatively from 0.4 millimeter to 0.8 millimeter, alternatively from 0.5 to 0.8 millimeter, although greater or lesser top cover thicknesses are possible.

As shown in the frontal overhead perspective view of FIG. 3, touchpad opening 106 is dimensioned to receive a separate touchpad 150 and keyboard opening 108 is dimensioned to receive a separate keyboard 152 (e.g., QWERTY or other selected keyboard design) when top cover 100 is assemble and mated with (and attached to) a notebook base component 204 of a notebook computer 350, i.e., to allow a user access to touch and actuate each of the separate touchpad 150 and keys of separate keyboard 152 from the upper surface of top cover 100. FIG. 3 also shows the assembled top cover 100 and base component 204 hingeably coupled to a lid component 214 that supports a display device 255 (e.g., light-emitting diode "LED" and/or liquid crystal display "LCD" display device).

In one embodiment, notebook base component 204 may be formed to include an inner frame and surrounding chassis enclosure (e.g., formed of thin plastic or sheet metal) that contains electronic circuitry components that perform computing and networking tasks, drive display of images on a display device of the notebook computer, actuate motion from haptics circuitry, sense user touch on touchpad 150 and user input to keys of keyboard 152, etc. Examples of such components include, but are not limited to, EE components, logic and printed circuit boards (PCBs) such as a central processing unit (CPU), a graphics processing unit (GPU), other programmable integrated circuits such as embedded controller (EC), PCBs, voltage regulation and battery, network interface controller (NIC), etc. Further information on electronic components and operation of a portable information handling system may be found in U.S. patent application Ser. No. 17/150,423 by Gerald R. Pelissier et al. and filed on Jan. 15, 2021, which is incorporated herein by reference in its entirety for all purposes.

As further shown in FIG. 1, single surface top cover 100 includes relatively narrow side walls 110a and 110b (e.g., having a width 191 in FIGS. 2A and 2B of greater than or equal to 1 millimeter wide, alternatively less than 5 millimeters wide, alternatively from 1 millimeter to 5 millimeters wide, alternatively from 2 millimeters to 5 millimeters wide) that are part of the same single unitary piece of impregnated thermoplastic fiberglass composite that makes up the palmrest area 102 and header area 104. When assembled and mated with notebook base component 204, side walls 110a and 110b are present at the left and right outside edges of the keyboard 152 as shown in FIG. 3. Also shown in the embodiment of FIG. 1 are relatively thin (e.g., from 1 millimeters to 5 millimeters) horizontal side walls 110c and 110d. As shown, side wall 110c separates keyboard opening 108 from touchpad opening 106, and side wall 110d defines the lower peripheral edge of touchpad opening 106. As shown in FIG. 3, when assembled and mated with notebook base component 204, side wall 110c is positioned between keyboard 152 and touchpad 150, side walls 110a and 110b are present at the left and right edges of the keyboard 152, and sidewall 110d is positioned at the lower edge of touchpad 150.

Figure 4:
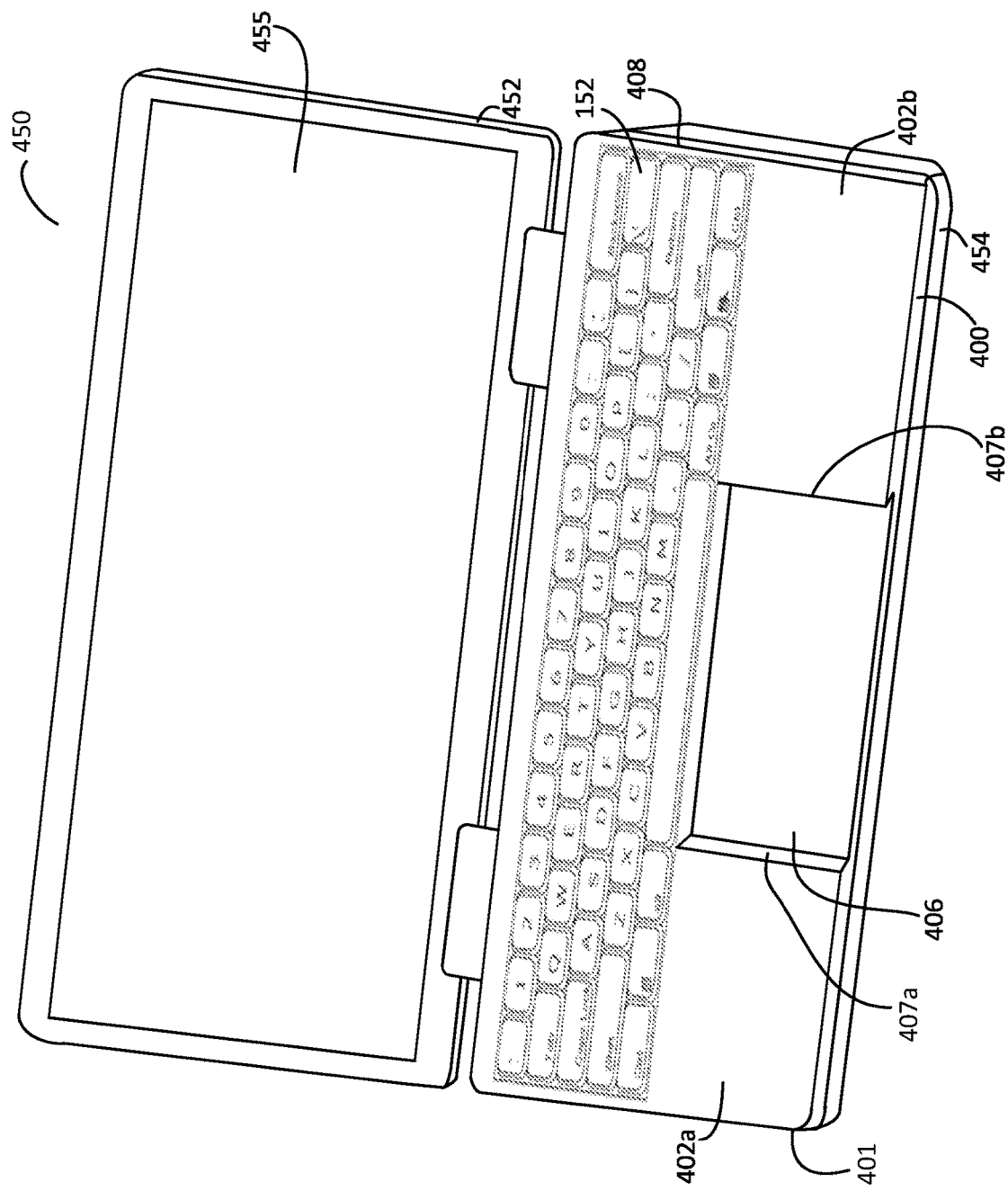
FIG. 4 illustrates a frontal overhead perspective view of a portable information handling system according to one exemplary embodiment of the disclosed apparatus and methods.

FIG. 4 illustrates an overhead frontal perspective view of a notebook computer 450 that includes a base component 454 (e.g., housing programmable integrated circuit/s such as central processing unit "CPU" and graphics processing unit "GPU", volatile and non-volatile memory, non-volatile storage, internal battery and power regulation circuits, etc.) that is hingeably coupled to a lid component 452 that supports a display device 455 (e.g., light-emitting diode "LED" and/or liquid crystal display "LCD" display device). As shown in FIG. 4, a single surface top cover 400 is attached to base component 454 (e.g., adhered to an inner frame of the base component), and is formed from a single unitary sheet of thermoplastic fiberglass composite which is impregnated with polycarbonate material. Similar to the embodiment of FIG. 1, a keyboard opening 408 is also defined within the single surface top cover 400 to receive a separate keyboard component 152 that itself is attached to base component 454 underlying top cover 400. Top cover 400 may have a thickness similar to that described for the embodiment of FIG. 1, and may have an outer peripheral edge 401 that corresponds in shape and dimensions to the outer shape and dimensions of upper surface of notebook computer base component 454 of FIG. 4, e.g., so that top cover 400 mates in complementary fashion to base component 454 when these two components are assembled and mated together.

In the embodiment of FIG. 4, single surface top cover 400 includes an integral step-down touchpad area 406 that is defined (e.g., by a corresponding step down area defined on the surface of tool 1202 of FIGS. 12A-12E) between a left palmrest area 402a and a right palmrest area 402b of the single surface top cover 400 (i.e., touchpad area 406 and palmrest areas 402a, 402b are all integral parts of the same single piece top cover 400). Touch-sensitive circuitry 533 (shown in FIG. 5) may also be attached to base component 454 in position beneath integral step-down touchpad area 406 to accept user touch input to the touchpad area 406. Configuration and operation of touch sensitive touchpad circuitry is described, for example, in U.S. patent application Ser. No. 16/859,015 filed on Apr. 27, 2020, which is incorporated herein by reference in its entirety for all purposes.

As shown, step-down touchpad area 406 is defined by steps 407a and 407b that displace the upper surface plane of touchpad area 406 downward and below the plane of upper surfaces of palmrest areas 402a and 402b, respectively, so as to provide a tactile feedback to a user of notebook computer 450 that indicates the location of the left and right boundaries of touchpad area 406. In one embodiment, the plane of upper surface of step-down touchpad area 406 may be displaced downward from 0.05 millimeter to 0.1 millimeter below the plane of upper surfaces of left palmrest area 402a and right palmrest area 402b, with the upper surfaces of left palmrest area 402a and right palmrest area 402b lying in the same plane. However, it will be understood that in other embodiments upper surface of step-down touchpad area 406 may be displaced downward by less than 0.05 millimeter or by greater than 0.1 millimeter below upper surfaces of left palmrest area 402a and right palmrest area 402b.

Figure 5:
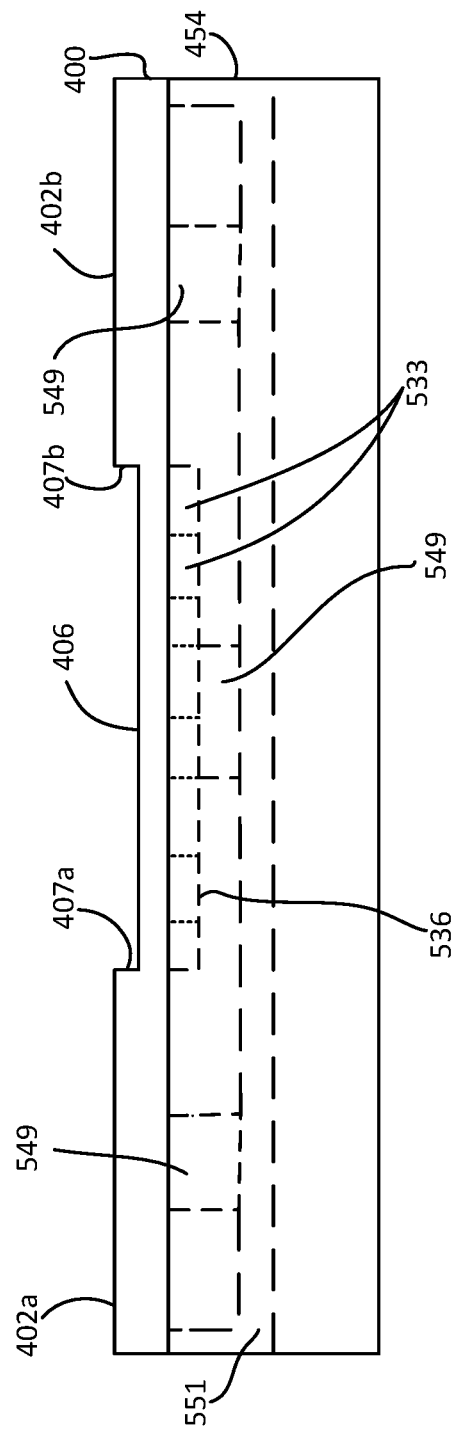
FIG. 5 illustrates a frontal edge view of the assembled top cover and base component of the portable information handling system of FIG. 4 according to one exemplary embodiment of the disclosed apparatus and methods.

FIG. 5 illustrates a frontal edge view of the assembled top cover 100 and base component 204 of FIG. 4, showing single surface top cover 400 attached to base component 454, with the integral step-down touchpad area 406 visible that is defined between the left palmrest area 402*a* and right palmrest area 402*b* of the single surface top cover 400. Also shown by hidden lines in FIG. 5 is optional haptics circuitry 549 (e.g., one or more piezo transducers coupled to vibrate the touchpad area 406 and/or palmrest areas 402*a* and 402*b*) that may be attached to an inner frame 551 of base component 204 (also shown in hidden lines) in position to contact and selectively impart haptics motion to the lower surface or underside 536 of touch sensitive circuitry 533 of touchpad area 406, e.g., under control of a host programmable integrated circuit such as a central processing unit (CPU) or embedded controller (EC) within notebook computer 450. In this regard, touch sensitive circuitry 533 that may be attached to base component 454 in position beneath the integrated step-down touchpad 406 to sense location of user touch input provided to upper surface of touchpad 406 by fingers of a user.

Figure 6:
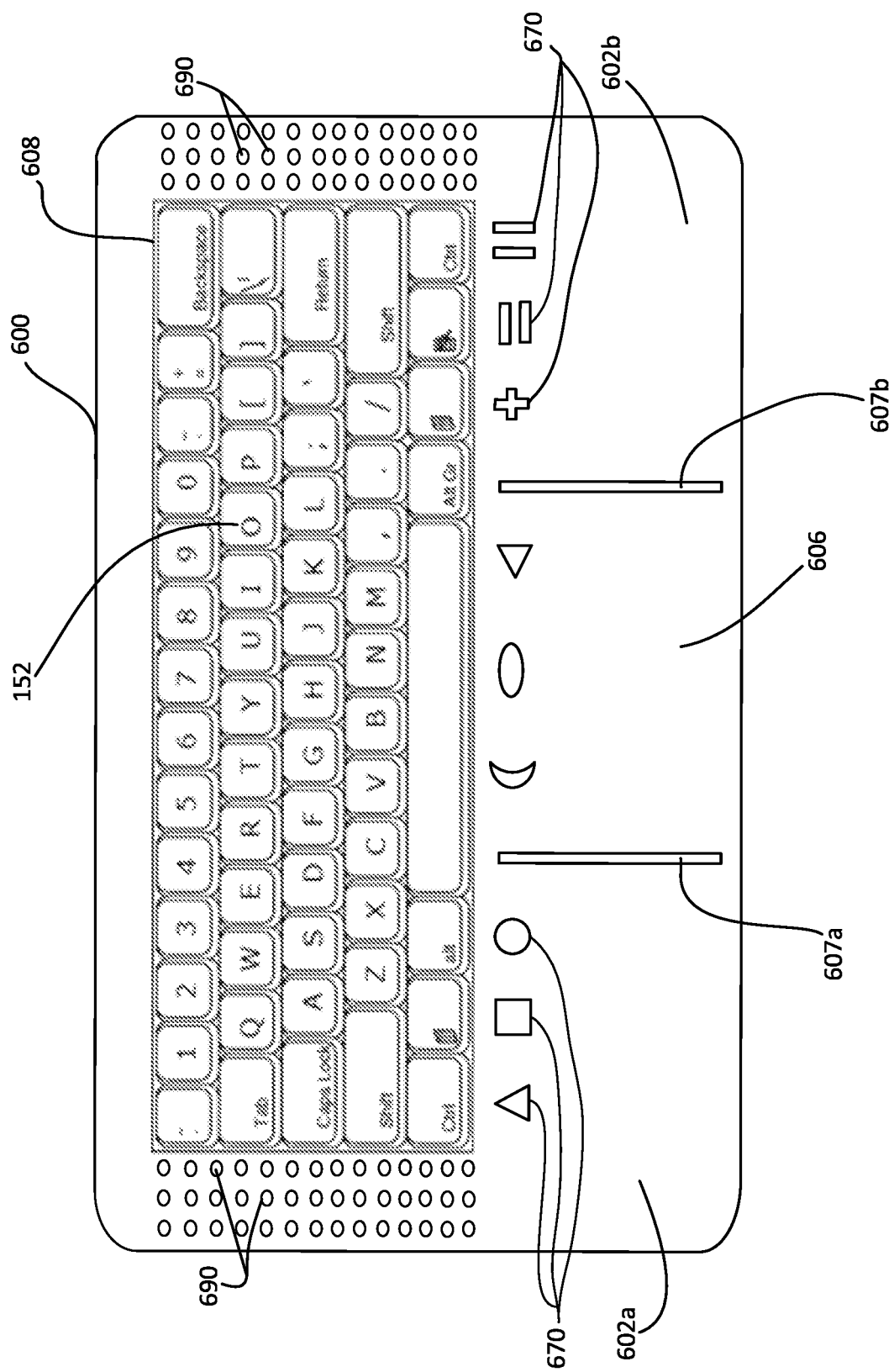
FIG. 6 illustrates an overhead view of a single surface top cover that is coupled to an underlying notebook computer base component according to one exemplary embodiment of the disclosed apparatus and methods.

FIG. 6 illustrates an overhead view of another embodiment of a single surface top cover 600 that is coupled to an underlying notebook computer base component 654 (shown in FIG. 7) that may be hingeably coupled to a lid component (not shown in FIG. 6) that supports a display device in a manner similar to that shown and described in relation to FIGS. 3 and 4. In the embodiment of FIG. 6, a single surface top cover 600 is formed from a single unitary sheet of thermoplastic fiberglass composite which is impregnated with polycarbonate material. Similar to the embodiments of FIGS. 1 and 4, a keyboard opening 608 is also defined within the single surface top cover 600 to receive a separate keyboard component 152 that itself is attached to the base component 654 underlying top cover 600. Top cover 600 of FIG. 6 may have a thickness similar to that described for embodiments of FIGS. 1 and 4. In the embodiment of FIG. 6, speaker hole arrays 690 (e.g., in one embodiment each speaker hole array being an array of multiple circular micro holes with each hole having a diameter of greater than 0.3 millimeters, alternatively from greater than 0.3 millimeters to 0.6 millimeters) through the body or substrate of top cover 600 for conveying sound to the upper surface of top cover 600 from two underlying speakers 675 mounted to the notebook computer base component 654 beneath the respective two speaker hole arrays 690 as shown in FIG. 7.

In the embodiment of FIG. 6, single surface top cover 400 includes light-transmissive vertical bars (e.g., borders or boundary markers) 607*a* and 607*b* (e.g., having 80% light transmissivity) that are etched into the impregnated polycarbonate material of top cover 600 to define the outer boundaries of an integral touchpad area 606 defined between a left palmrest area 602*a* and a right palmrest area 602*b* of the single surface top cover 600 (e.g., touchpad area 606 and palmrest areas 602*a*, 602*b* may all lie in the same plane as each other and may all be integral parts of the same single piece top cover 600). When illuminated from beneath top cover 600 (e.g., lit by one or more upward-facing light elements 645 such as light-emitting diodes "LEDs" mounted to frame 651 within base component 654), light-transmissive bars 607*a* and 607*b* transmit light that emanates from the upper surface of top cover 600 and is visible to a user of the notebook computer to indicate the location of the left and right outer boundaries of touchpad area 606.

FIG. 6 also illustrates optional light-transmissive (e.g., 80% light transmissivity) icons 670 that may be additionally or alternatively etched into the impregnated polycarbonate material of top cover 600 under keyboard 152, e.g., such as to form a function row. When present, each of icons 670 may be illuminated from beneath top cover 600 (e.g., lit by one or more upward-facing light elements 645 such as LEDs mounted on frame 651 within base component 654 shown in FIG. 7) and transmit light that emanates from the upper surface of top cover 600 and is visible to a user of the notebook computer, e.g., to indicate status and/or provide touch-sensitive function buttons such as audio volume, audio mute, microphone on/off, etc. In one embodiment, touch-sensitive circuitry 635 may also be attached to base component 654 in position beneath the individual icons 660 to accept user touch input to control the respective functions of each icon. This is in addition to touch sensitive circuitry 633 that may be attached to base component 654 in position beneath the integrated touchpad 606 to sense location of user touch input provided to upper surface of touchpad 606 by fingers of a user.

Figure 7:
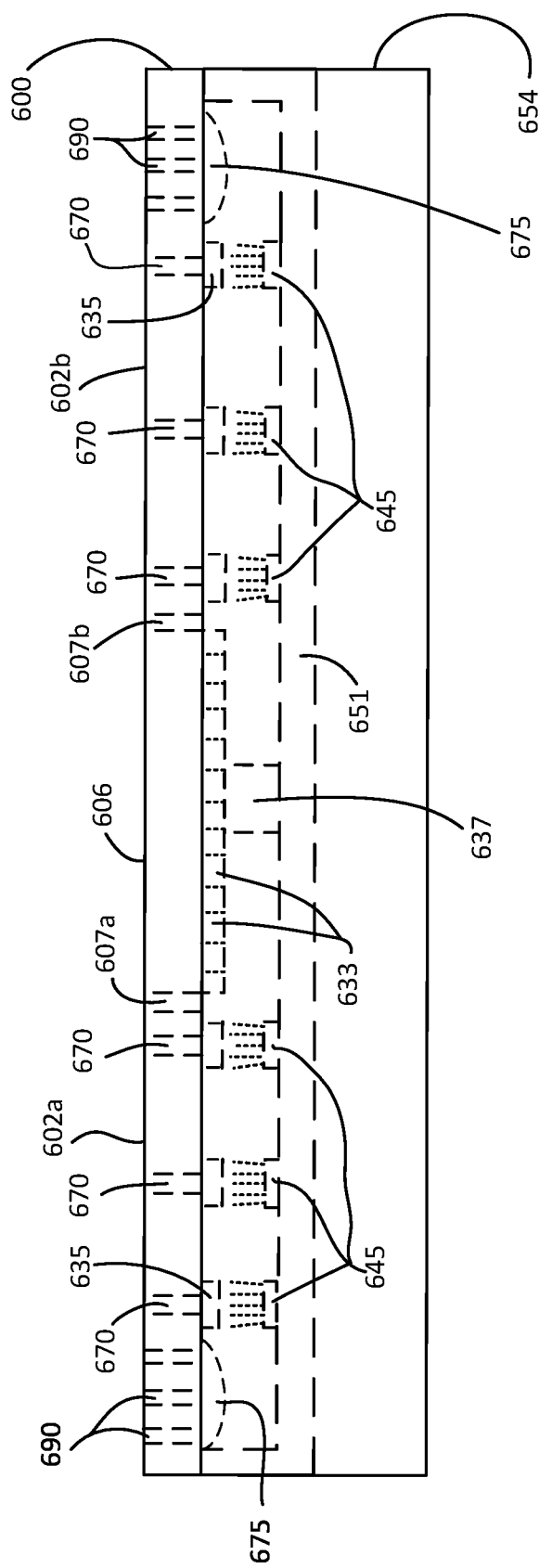
FIG. 7 illustrates a frontal edge view of the assembled top cover and base component of the portable information handling system of FIG. 6 according to one exemplary embodiment of the disclosed apparatus and methods.

FIG. 7 illustrates a front end view of the assembled top cover 600 and a base component 654 of FIG. 6, showing single surface top cover 600 attached to base component 654, with the integral touchpad area 606 visible that is defined between the left palmrest area 602*a* and right palmrest area 602*b* of the single surface top cover 600. Shown in hidden lines are touch-sensitive circuitry 633 and upward-facing light elements 645 that may be positioned between each of the light-transmissive bars 607*a* and 607*b*, and beneath each of the light transmissive icons 670. Also shown by hidden lines in FIG. 7 is optional haptics circuitry 637 that may be attached to base component 654 in position to contact and selectively impart haptics motion to the underside of touchpad area 606, e.g., under control of a host programmable integrated circuit such as a central processing unit (CPU) or embedded controller (EC) within the notebook computer base component 654.

Figure 8:
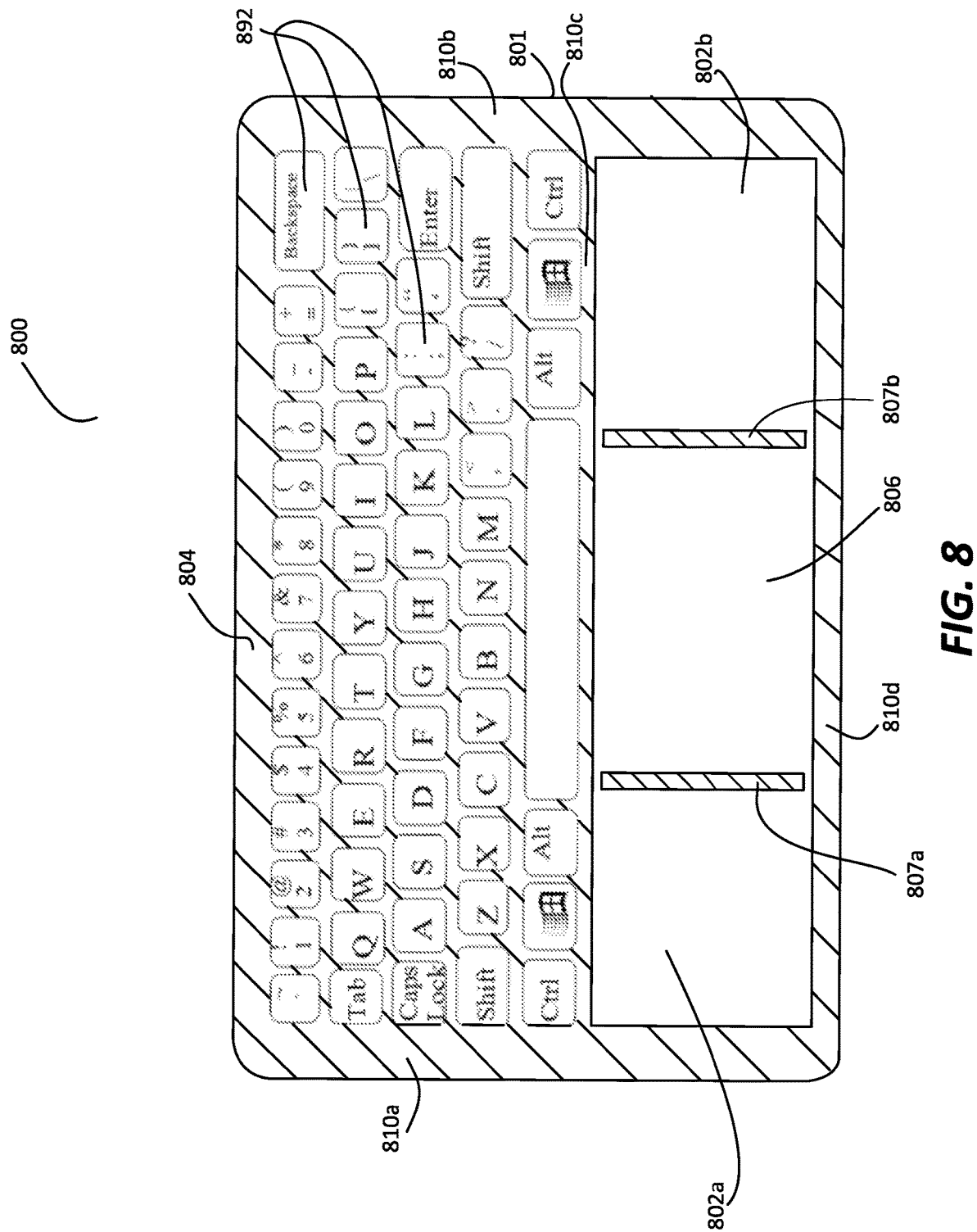
FIG. 8 illustrates an overhead view of a single surface top cover according to one exemplary embodiment of the disclosed apparatus and methods.

FIG. 8 illustrates an overhead view of another exemplary embodiment of a single surface top cover 800 for a notebook computer in the form of a single unitary and seamless sheet substrate of thermoplastic fiberglass composite which is impregnated with polycarbonate material. In this embodiment, a selective UV molding process described further herein is employed to create multiple different finishes on selected areas of the upper surface of single surface top cover 800 without the presence of openings defined through top cover 800. In particular, a first finish (e.g., non-gloss matte finish) is created to define an integral palmrest area 806 and integral functional areas (e.g., including active features such as keyboard keys 892 of an integral keyboard area and touch-sensitive surface of touhpad area 806), while a different and a second finish (e.g., gloss finish shown by hatching in FIG. 8) is created to define integral bezel areas such as side walls 810*a* and 810*b*, header area 804, and horizontal side wall 810*d*. In the embodiment of FIG. 8, the second finish is also created to define vertical bars (or borders) 807*a* and 807*b* that delineate touchpad area 806 from palmrest area 802, and horizontal border 810*c* that delineates keyboard keys 892 from palmrest areas 802*a*/802*b* and touchpad area 806. Other features defined by the second finish include lettering, numbering and/or other indicia to identify each of the keyboard keys 892 as shown in FIG. 8. In the embodiment of FIG. 8, single surface top cover 800 may be assembled and mated with (and attached to) a notebook computer base component (e.g., such as notebook computer base component 204 previously described herein) that includes respective touch-sensitive circuitry attached to the base component in position beneath each of touchpad area 806 and keyboard keys 892 in order to sense user input.

In another embodiment, one or more features illustrated in FIG. 8 may be formed by printing with ink onto a single unitary sheet of thermoplastic fiberglass composite, i.e., rather than by forming these features with a different finish. Examples features that may be so printed include, but are not limited to, vertical bars (or borders) 807*a* and 807*b* that delineate touchpad area 806 and/or lettering, numbering and/or other indicia to identify each of the keyboard keys 892, etc.

Figure 9:
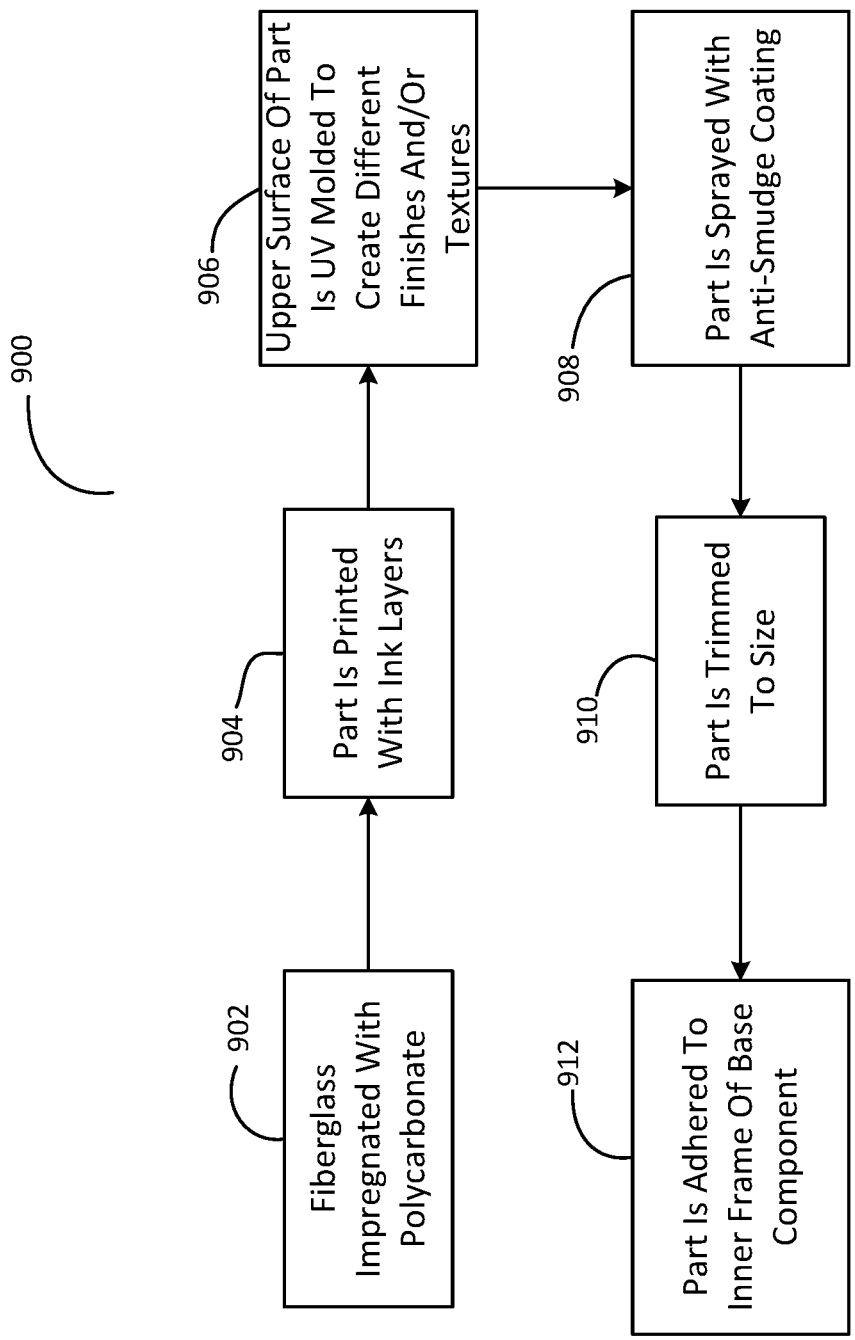
FIG. 9 illustrates methodology according to one exemplary embodiment of the disclosed apparatus and methods.
Figure 10:
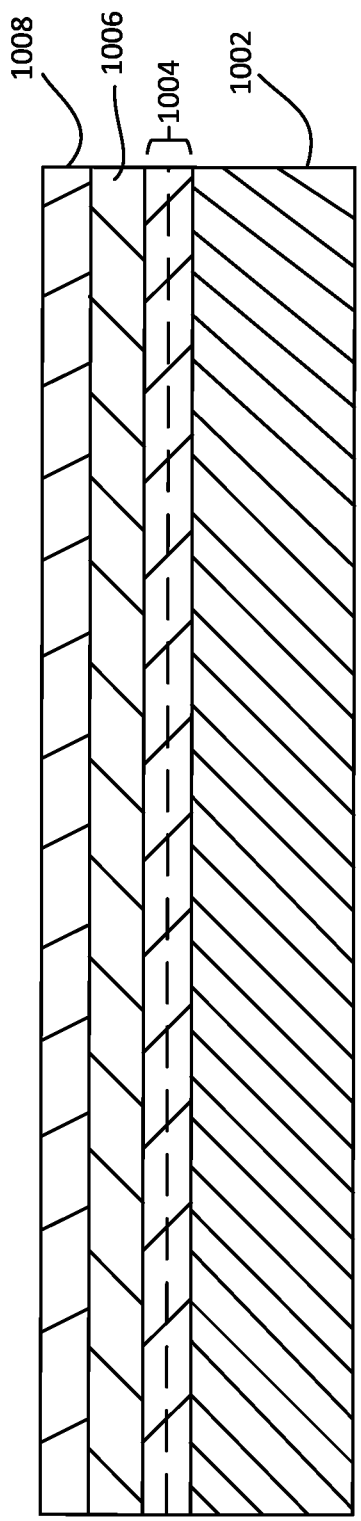
FIG. 10 illustrates a simplified cross section of an exemplary layer stackup of the methodology of FIG. 9 according to one exemplary embodiment of the disclosed apparatus and methods.

FIGS. 9 and 10 illustrate one exemplary embodiment of methodology 900 that may be employed to form a single surface top cover (e.g., such as illustrated and described in relation to FIGS. 1-8) from a single unitary sheet of thermoplastic fiberglass composite which is impregnated with polycarbonate material. As shown, methodology 900 begins in block 902 where a sheet-like part of fiberglass material is impregnated with polycarbonate to form a laminate sheet 1002 having a thickness of from 0.5 millimeters to 0.8 millimeters and alternatively 0.7 millimeters, although laminate sheet 1002 may alternatively be formed to have a thickness less than 0.5 millimeters or greater than 0.8 millimeter in other embodiments. In one embodiment, the resulting thermoplastic fiberglass composite sheet 1002 may include from 3 to 5 layers of woven fiberglass material present in an amount of from 40% to 70% by volume fiber content, alternatively 32% by volume fiber content, although woven fiberglass material may alternatively be present in an amount greater than 70% by volume fiber content or less than 40% by volume fiber content in other embodiments. Any suitable type of woven fiberglass may be employed, e.g., such as plain weave, twill, etc.

In the exemplary embodiment of FIGS. 9 and 10, thermoplastic fiberglass composite sheet 1002 may be impregnated with 30% to 60% by volume polycarbonate polymer which may or may include recycled polycarbonate polymer. In one embodiment, thermoplastic fiberglass composite sheet 1002 may have a stiffness provided by a flexural modulus of from 10 to 25 gigapascals (GPa), alternatively 15 GPa. It will be understood that the above characteristics of the impregnated thermoplastic fiberglass composite sheet 1002 is exemplary only, and that in other embodiments the amount of thermoplastic fiberglass material in the composite may be more or less than 32% by volume, and/or the amount of polycarbonate polymer may be more than 60% by volume or less than 30% by volume. Moreover, the stiffness or flexural modulus of an impregnated thermoplastic fiberglass composite sheet 1002 may be less than 10 GPa or greater than 25 GPa. Examples of suitable impregnated thermoplastic fiberglass composite materials include, but are not limited to, an impregnated thermoplastic fiberglass composite material that includes multiple layers of fiberglass material and that is available as GF9xIP from InnoPeak Advanced Materials of Taichung, Taiwan.

In block 904 of methodology 900, the impregnated fiberglass part (e.g., sheet) 1002 from block 902 may be screen printed (e.g., such as with different color layers of ink 1004 or other printed material and/or printed effects such as mica, sparkle, etc,) to form lettering, numbering, and/or other indicia such as described in relation to FIG. 8. Next, in block 906, a UV molding process may be employed to create UV molding features 1006 (e.g., using polyurethane acrylate) that may include multiple different finishes and/or textures on the upper two-dimensional surface of printed impregnated fiberglass part 1002, e.g., such as illustrated and described in relation to FIG. 8. One embodiment of a suitable UV molding process is illustrated and described in relation to FIGS. 11 and 12A-12E herein.

Next, in optional block 908, the upper surface of impregnated fiberglass part 1002 may be sprayed with an anti-smudge coating 1008, e.g., such as PPG EC1103-D™ available from PPG Industries, Inc. of Pittsburgh, Pennsylvania. FIG. 10 illustrates a simplified cross section of an exemplary stackup of the different layers of the single surface top cover of FIG. 9 after completion of block 908.

Next, in block 910, the impregnated fiberglass part 1002 may be trimmed to size, e.g., to have an outer peripheral edge 101 that is complementary to (and matches) the outer peripheral dimensions of a notebook computer base component, e.g., such as previously-described and illustrated outer peripheral edge 401 that is dimensioned to match and mate with notebook computer base component 454 of FIG. 4. After trimming, the impregnated fiberglass part 1002 may be assembled and mated with (e.g., adhered and attached with epoxy or other suitable adhesive) to an inner frame 551 (e.g., aluminum frame, magnesium frame, etc.) of base component 454 as shown and described in relation to FIG. 5.

Figure 11:
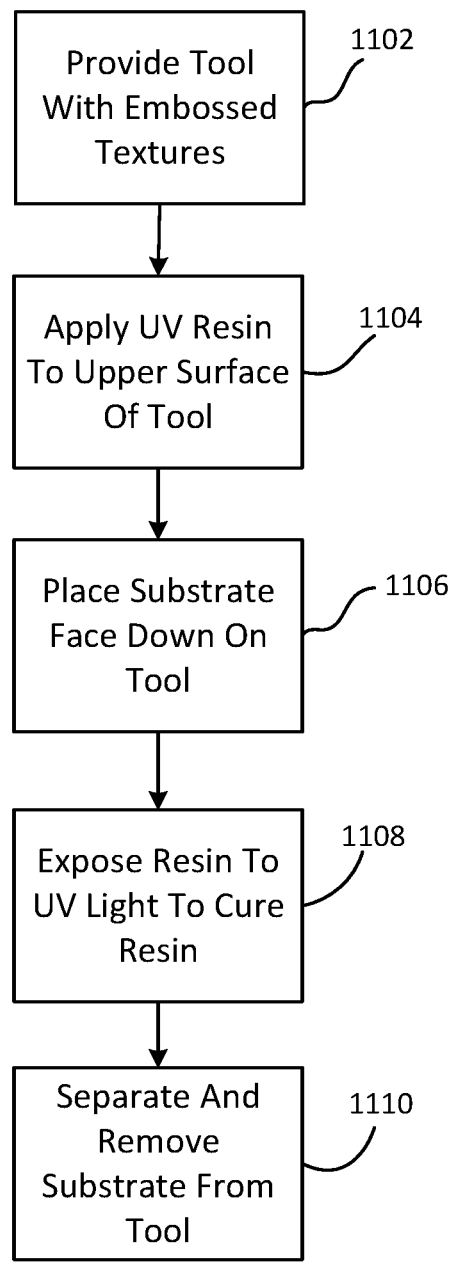
FIG. 11 illustrates methodology according to one exemplary embodiment of the disclosed apparatus and methods.

FIG. 11 illustrates one embodiment of a methodology 1100 that may be implemented to UV mold the upper surface of a single surface top cover that is formed from a single unitary sheet of impregnated thermoplastic fiberglass, e.g., such as during block 906 of methodology 900. Methodology 1100 may be employed, for example, to fabricate multiple different finishes on selected areas of the upper surface of a single surface top cover 800 shown in FIG. 8. FIGS. 12A-12E illustrate a side view of a tool 1202 and single unitary sheet 1206 of impregnated thermoplastic fiberglass during the UV molding process of methodology 1100.

Figure 12A:
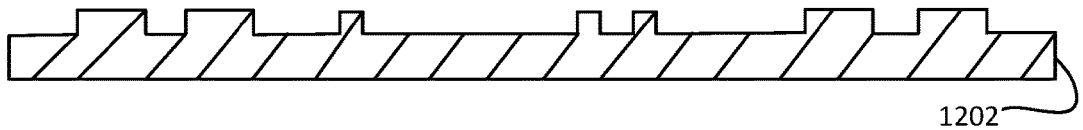
FIG. 12A illustrates a side view of a tool and single unitary sheet of impregnated thermoplastic fiberglass of the methodology of FIG. 11 according to one exemplary embodiment of the disclosed apparatus and methods.
Figure 12B:
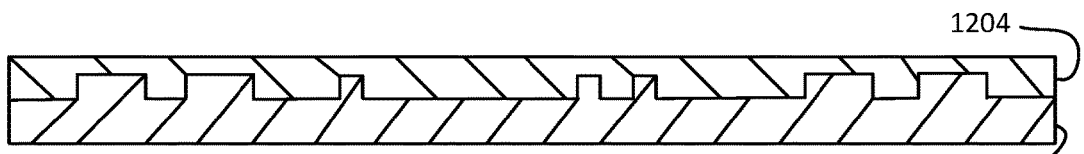
FIG. 12B illustrates a side view of a tool and single unitary sheet of impregnated thermoplastic fiberglass of the methodology of FIG. 11 according to one exemplary embodiment of the disclosed apparatus and methods.
Figure 12C:
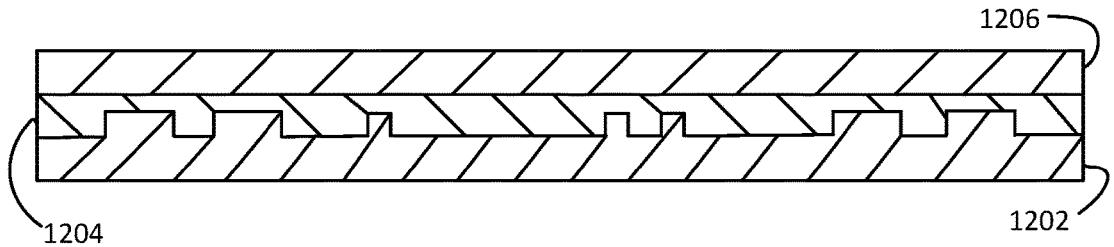
FIG. 12C illustrates a side view of a tool and single unitary sheet of impregnated thermoplastic fiberglass of the methodology of FIG. 11 according to one exemplary embodiment of the disclosed apparatus and methods.

Methodology 1100 begins in block 1102, where a transparent tool 1202 (e.g., a mold constructed of glass) having one or more desired embossed and/or texture/s on its upper surface is provided as shown in FIG. 12A, e.g., to achieve the desired gloss level (e.g., a high gloss finish with glass-like feel in some embodiments) for glossy portions of the completed single surface top cover and to achieve a non-glossy or matte finish for other portions of the completed single surface top cover. Next, in block 1104, a UV resin 1204 (e.g., such as UV-curable polyurethane acrylate or other suitable UV resin) is placed over the entire upper surface of the tool 1202 as shown in FIG. 12B. Then, in block 1106, the substrate 1206 of an impregnated fiberglass part (e.g., printed impregnated fiberglass part 1002 from block 906) is placed face down (upper side down) on UV resin 1204 (e.g., with the color/graphics of its screen printed upper surface contacting the UV resin 1204) and pressed down firmly against the UV resin 1204 and upper surface of tool 1202 as shown in FIG. 12C to leave a thickness of UV resin 1204 that is 10 microns to 20 microns in one embodiment (although pressed thickness of UV resin 1204 may alternatively be less than 10 microns or greater than 20 microns in other embodiments).

Figure 12D:
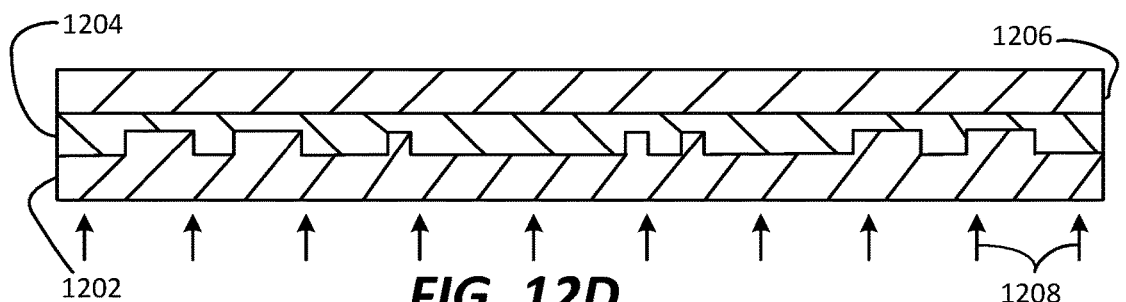
FIG. 12D illustrates a side view of a tool and single unitary sheet of impregnated thermoplastic fiberglass of the methodology of FIG. 11 according to one exemplary embodiment of the disclosed apparatus and methods.
Figure 12E:
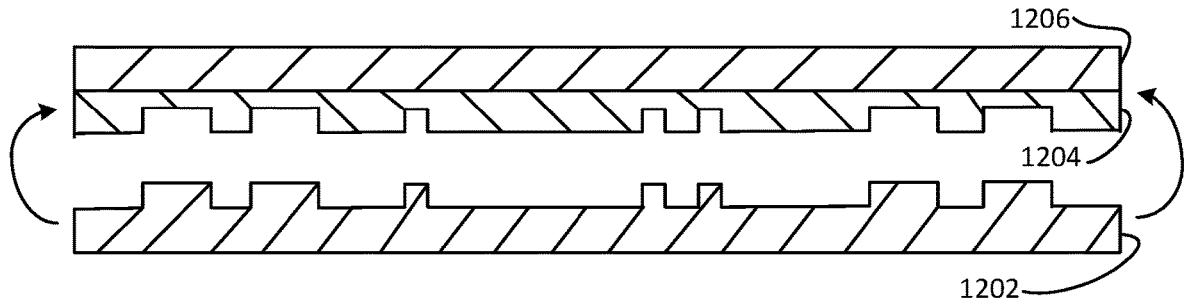
FIG. 12E illustrates a side view of a tool and single unitary sheet of impregnated thermoplastic fiberglass of the methodology of FIG. 11 according to one exemplary embodiment of the disclosed apparatus and methods.

Next, in block 1108, UV light 1208 is directed from a UV light source through transparent tool 1202 onto the impregnated fiberglass part substrate 1206 as shown in FIG. 12D to expose and activate and cure the UV resin 1204 to provide a durable entire upper surface to the completed top cover. After UV curing of block 1108, the substrate of impregnated fiberglass part 1206 is removed (e.g., lifted) and separated from the surface of the tool 1202, leaving an impression of the desired embossed texture/s of the tool 1202 on the cured resin upper surface of the part substrate 1206 as shown in FIG. 12E. One example of such a cured texture/s may include multiple different finishes (e.g., both glossy finish areas and matte finish areas) on selected areas of the upper surface of the part substrate to form a single surface top cover 800 as shown and described in relation to FIG. 8.

It will be understood that the particular order and identity of the blocks of methodologies 900 and 1100 are exemplary only, and that any combination of fewer, additional, and/or alternative process blocks (and order of blocks thereof) may be employed that is suitable for forming a single surface top cover having selected desired features for a portable information handling system from a single unitary sheet of thermoplastic fiberglass composite which is impregnated with polycarbonate material.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed apparatus and methods may be utilized in various combinations and/or independently. Thus the invention is not limited to only those combinations shown herein, but rather may include other combinations.

What is claimed is:

1. An apparatus, comprising:
   a non-glass single surface top cover dimensioned to mate with a base component of a portable information handling system, the single surface top cover comprising a single unitary substrate of thermoplastic fiberglass composite that is impregnated with polycarbonate material;
   where the single surface top cover has an upper surface; and where the apparatus further comprises an ultraviolet (UV) light-cured resin layer disposed on the upper surface of the single surface top cover.

2. The apparatus of claim 1,
   where the single surface top cover defines:
      a keyboard area; and
      a touchpad area separate and different from the keyboard area, the touchpad area being defined between a first palmrest area and a second palmrest area; the upper surface of the single surface top cover defining a plane of an upper surface of the touchpad area that is stepped down from a plane of an upper surface of the first portion of the palmrest area and that is stepped down from a plane of an upper surface of the second portion of the palmrest area.

3. The apparatus of claim 1, where the UV light-cured resin layer disposed on the upper surface defines different textures on different areas of the upper surface of the single surface top cover, the different textures comprising a gloss texture and a matte texture.

4. The apparatus of claim 1, where the single surface top cover defines at least one of:
   a palmrest area and a touchpad area that are integrated together within the substrate of the single surface top cover with an active touch sensitive surface of the touchpad area defined on an upper surface of the single surface top cover and with no gaps defined within the substrate between the palmrest area and the touchpad area; or
   a palmrest area and a keyboard area that are integrated together within the substrate of the single surface top cover with active keyboard keys of the keypad area defined on an upper surface of the single surface top cover and with no gaps in the substrate around the keyboard area.

5. The apparatus of claim 1, further comprising a touchpad area defined between a first palmrest area and a second palmrest area; a plane of an upper surface of the touchpad area being stepped down from a plane of an upper surface of the first portion of the palmrest area and stepped down from a plane of an upper surface of the second portion of the palmrest area.

6. The apparatus of claim 1, where the single surface top cover defines each of a palmrest area, a touchpad area, and a keyboard area that are integrated together within the substrate of the single surface top cover with no openings defined through the substrate of the single surface top cover.

7. The apparatus of claim 1, where the single surface top cover further comprises one or more light-transmissive areas etched into the substrate, the light-transmissive areas defining at least one of icons or boundary markers between different areas of the single surface top cover.

8. The apparatus of claim 1, where the single surface top cover further comprises one or more sound-transmissive openings etched into the substrate in one or more areas overlying the position of at least one speaker of the base components when the single surface top cover is assembled and mated with the base component of the portable information handling system.

9. The apparatus of claim 1, further comprising a keyboard opening defined through an entire thickness of the single surface top cover and dimensioned to receive a keyboard of the base component; where the single surface top cover comprises left and right side walls present at left and right outside edges of the keyboard opening; and where a width of each of the left and right side walls is from 1 millimeter to 5 millimeters.

10. The apparatus of claim 1, further comprising the base component of the portable information handling system assembled and mated to the single top cover; where the single surface top cover has a lower surface and defines a palmrest area and a touchpad area that are integrated together within the substrate of the single surface top cover; and where the apparatus further comprises haptics circuitry of the base component that is coupled in position to contact the lower surface of the single surface top cover to impart haptics motion to the touchpad area of the single surface top cover.

11. The apparatus of claim 1, further comprising the base component of the portable information handling system assembled and mated to the single top cover; where the portable information handling system comprises a notebook computer.

12. The apparatus of claim 1, where the UV light-cured resin layer completely covers the upper surface of the single surface top cover.

13. A method, comprising:
forming a non-glass single surface top cover dimensioned to mate with a base component of a portable information handling system, the single surface top cover comprising a substrate of thermoplastic fiberglass composite that is impregnated with polycarbonate material;
where the single surface top cover has an upper surface; and where the method further comprises defining different textures on different areas of the upper surface of the single surface top cover by:
first providing a mold tool having different embossed textures defined on a first surface of the mold tool,
then disposing an ultraviolet (UV) light-curable resin layer over the first surface of the mold tool,
then pressing the first surface of the mold tool against the UV light-curable resin layer disposed on the upper surface of the single surface top cover to cause the first surface of the mold tool to create an impression of the embossed textures in the UV light-curable resin layer,
then curing the UV light-curable resin layer to form a cured impression of the embossed textures in the cured UV light curable resin layer while the UV light-curable resin layer is disposed in contact between the upper surface of the single surface top cover and the first surface of the mold tool, and
then separating the first surface of the mold tool from the cured UV light-curable resin layer that is disposed on the upper surface of the single surface top cover such that the cured impression of the embossed textures in the cured UV light curable resin layer forms the different textures on the different areas of the upper surface of the single surface top cover.

14. The method of claim 13,
where the method further comprises forming the single surface top cover to define:
a keyboard area; and
a touchpad area separate and different from the keyboard area, the touchpad area being defined between a first palmrest area and a second palmrest area; the upper surface of the single surface top cover defining a plane of an upper surface of the touchpad area that is stepped down from a plane of an upper surface of the first portion of the palmrest area and that is stepped down from a plane of an upper surface of the second portion of the palmrest area.

15. The method of claim 13, further comprising printing lettering, numbering, and/or other indicia on the upper surface of the single surface top cover prior to curing the UV light-curable resin layer disposed in contact between the upper surface of the single surface top cover and the mold tool surface.

16. The method of claim 13, further comprising forming the single surface top cover to define at least one of:
a palmrest area and a touchpad area that are integrated together within the substrate of the single surface top cover with an active touch sensitive surface of the touchpad area defined on an upper surface of the single surface top cover and with no gaps defined within the substrate between the palmrest area and the touchpad area; or
a palmrest area and a keyboard area that are integrated together within the substrate of the single surface top cover with active keyboard keys of the keypad area defined on an upper surface of the single surface top cover and with no gaps in the substrate around the keyboard area.

17. The method of claim 13, further comprising forming the single surface top cover to define a touchpad area between a first palmrest area and a second palmrest area with a plane of an upper surface of the touchpad area being stepped down from a plane of an upper surface of the first palmrest area and stepped down from a plane of an upper surface of the second palmrest area.

18. The method of claim 13, further comprising forming the single surface top cover to define each of a palmrest area, a touchpad area, and a keyboard area that are integrated together within the substrate of the single surface top cover with no openings defined through the substrate of the single surface top cover.

19. The method of claim 13, further comprising etching one or more light-transmissive areas into the substrate of the single surface top cover to define at least one of icons or boundary markers between different areas of the single surface top cover.

20. The method of claim 13, further comprising etching one or more sound-transmissive openings into the substrate in one or more areas corresponding to at least one speaker of a portable information handling system.

21. The method of claim 13, further comprising assembling and mating the single surface top cover to the base component of the portable information handling system.

22. The method of claim 13, where the mold tool is a transparent mold tool; and where the curing the UV light-curable resin layer comprises directing UV light from a UV light source through the transparent mold tool to cure the UV light-curable resin on the upper surface of the single surface top cover.

23. The method of claim 22, where the transparent mold tool is glass.

* * * * *